United States Patent
Hirasawa

(10) Patent No.: US 9,336,817 B1
(45) Date of Patent: May 10, 2016

(54) SPINDLE MOTOR AND DISK DRIVE APPARATUS

(71) Applicant: Nidec Corporation, Kyoto (JP)

(72) Inventor: Toshihiro Hirasawa, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 14/835,930

(22) Filed: Aug. 26, 2015

(30) Foreign Application Priority Data

Mar. 13, 2015 (JP) .................................. 2015-051328

(51) Int. Cl.
| | | |
|---|---|---|
| *G11B 17/02* | (2006.01) | |
| *G11B 19/20* | (2006.01) | |
| *H02K 5/16* | (2006.01) | |
| *G11B 33/14* | (2006.01) | |

(52) U.S. Cl.
CPC ............ *G11B 19/2009* (2013.01); *G11B 17/02* (2013.01); *G11B 33/148* (2013.01); *H02K 5/165* (2013.01)

(58) Field of Classification Search
CPC ....................................................... G11B 17/02
USPC ................................... 360/99.08, 99.12, 99.06
See application file for complete search history.

(56) References Cited

U.S. PATENT DOCUMENTS

| | | | |
|---|---|---|---|
| 2002/0191332 A1* | 12/2002 | Elsing .................. | G11B 17/038 360/99.08 |
| 2005/0088777 A1 | 4/2005 | Chee et al. | |
| 2006/0023339 A1 | 2/2006 | Fukuyama et al. | |
| 2006/0232876 A1 | 10/2006 | Xu et al. | |
| 2006/0291093 A1 | 12/2006 | Xu et al. | |
| 2008/0124239 A1 | 5/2008 | Xu et al. | |
| 2011/0255191 A1* | 10/2011 | Watanabe .......... | G11B 17/0287 360/99.08 |

FOREIGN PATENT DOCUMENTS

JP        2006-040423 A        2/2006

\* cited by examiner

*Primary Examiner* — Allen T Cao
(74) *Attorney, Agent, or Firm* — Keating & Bennett, LLP

(57) ABSTRACT

A spindle motor is used in a disk drive apparatus including a cover member to be attached to the spindle motor. The spindle motor includes a rotor portion; a bearing portion; a stator portion; a base portion molded by casting, and arranged to contain the rotor portion, the bearing portion, and the stator portion; and a screw attachment member fixed to the base portion, and including a screw hole. The base portion includes a plate portion arranged to extend radially with respect to a central axis, and a wall portion arranged to extend in an axial direction from a radially outer edge of the plate portion. The wall portion is arranged to support at least a portion of the cover member. An inside surface of the base portion includes a metal surface subjected to a cutting process. The screw attachment member is arranged on the wall portion.

18 Claims, 8 Drawing Sheets

SPINDLE MOTOR AND DISK DRIVE APPARATUS

BACKGROUND OF THE INVENTION

1. Field of the Invention

The present invention relates to a spindle motor and a disk drive apparatus.

2. Description of the Related Art

In recent years, in accordance with increased storage density of disks, there has been a demand for disk drive apparatuses, such as, for example, hard disk drives, to control rotation of the disks, movement of heads, and so on with high precision. In a known hard disk drive (HDD) disclosed in JP-A 2006-40423, a gas arranged in an interior of the HDD is a low-density gas, such as, for example, a helium gas or a hydrogen gas, and the HDD is thus arranged to achieve a reduction in resistance of the gas against a disk, a head, and so on during rotation of a spindle motor. The reduction in the resistance of the gas against the disk, the head, and so on contributes to reducing vibration of the disk, the head, and so on, enabling highly precise data recording. Such a disk drive apparatus includes a base defined by machining a plate material, such as, for example, an SPCC plate, or a casting of an aluminum-based alloy.

Bases of some spindle motors (hereinafter referred to simply as "motors") installed in HDDs are defined by portions of housings of the HDDs. In the case where the interior of the HDD is filled with a gas such as a helium gas or the like as described in JP-A 2006-40423, the helium gas, for example, which has extremely small molecules, tends to easily leak out of the interior of the HDD to an outside of the HDD. In the case of such a spindle motor, a base of the spindle motor is produced by casting, and accordingly, a blowhole may be defined in the base. Such a blowhole is, for example, exposed on a surface of the base, which has been subjected to a cutting process. Thus, the blowhole may join a space inside the base to a space outside the base through the surface of the base which has been subjected to the cutting process. If this happens, a gas, such as a helium gas or the like, which is arranged in the space inside the base may leak out to the space outside the base.

SUMMARY OF THE INVENTION

A spindle motor according to a preferred embodiment of the present invention is used in a disk drive apparatus including a cover member to be attached to the spindle motor. The spindle motor includes a rotor portion arranged to rotate about a central axis extending in a vertical direction, and including a rotor magnet; a bearing portion arranged to support the rotor portion such that the rotor portion is rotatable about the central axis; a stator portion arranged opposite to the rotor magnet; a base portion molded by casting, and arranged to contain the rotor portion, the bearing portion, and the stator portion; and a screw attachment member fixed to the base portion, and including a screw hole. The base portion includes a plate portion arranged to extend radially with respect to the central axis, and a wall portion arranged to extend in an axial direction from a radially outer edge of the plate portion. The wall portion is arranged to support at least a portion of the cover member. An inside surface of the base portion includes a metal surface subjected to a cutting process. The screw attachment member is arranged on the wall portion.

According to preferred embodiments of the present invention, a spindle motor and a disk drive apparatus which have structures which are able to prevent a leakage of an internal gas are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
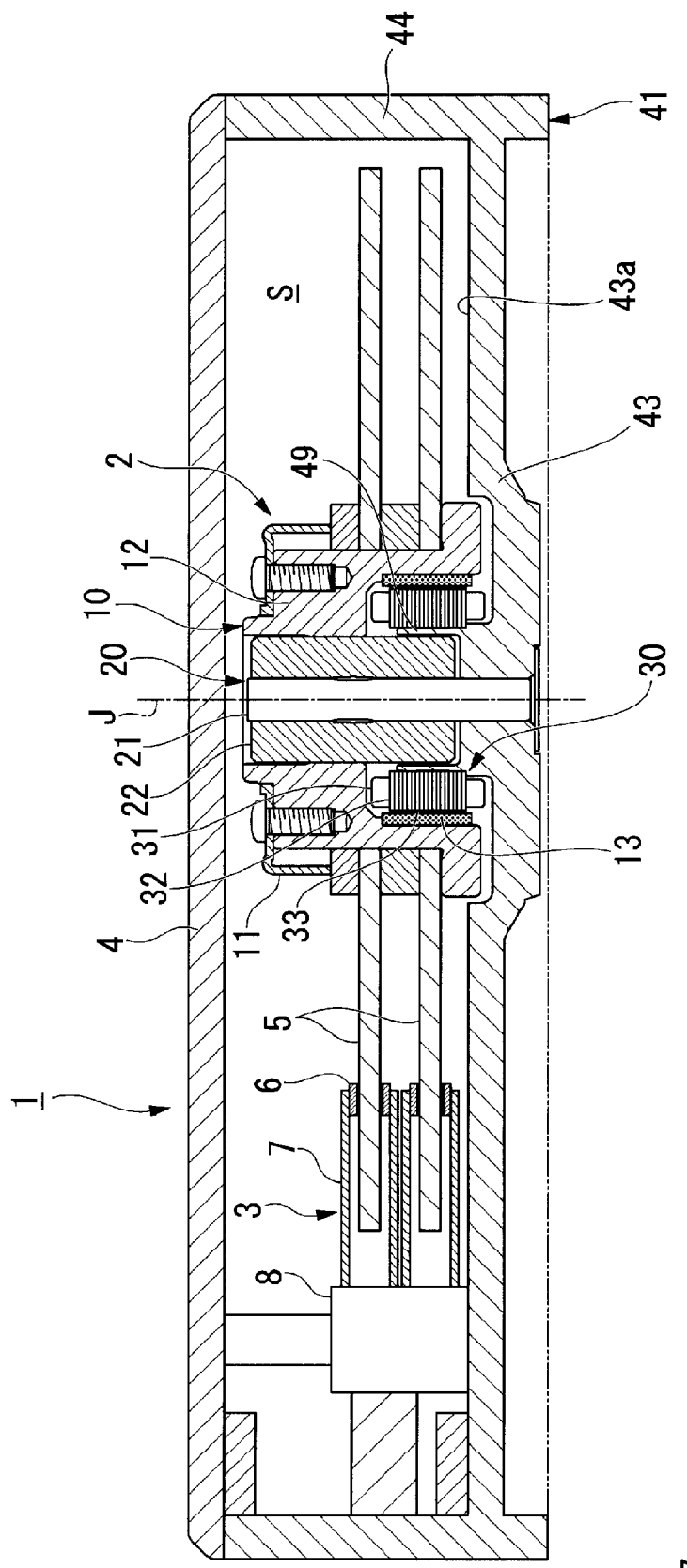
FIG. 1 is a cross-sectional view of a disk drive apparatus according to a first preferred embodiment of the present invention.
Figure 1:
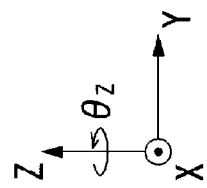

Hereinafter, motors according to preferred embodiments of the present invention will be described with reference to the accompanying drawings. Note that the scope of the present invention is not limited to the preferred embodiments described below, but includes any modification thereof within the scope of the technical idea of the present invention. Also note that scales, numbers, and so on of members or portions illustrated in the following drawings may differ from those of actual members or portions, for the sake of easier understanding of the members or portions.

In the accompanying drawings, an xyz coordinate system is shown appropriately as a three-dimensional orthogonal coordinate system. In the xyz coordinate system, a z-axis direction is assumed to be a direction parallel to a central axis J shown in FIG. 1. A y-axis direction is assumed to be a direction perpendicular to the z-axis direction, and is assumed to be a horizontal direction in FIG. 1. An x-axis direction is assumed to be a direction perpendicular to both the z-axis direction and the y-axis direction. In addition, a circumferential direction about the central axis J will be referred to as a $\theta_z$ direction.

In addition, it is assumed in the following description that a direction in which the central axis J extends (that is, the z-axis direction) is a vertical direction. A positive side (i.e., a +z side) in the z-axis direction will sometimes be referred to as an upper side (or an axially upper side), while a negative side (i.e., a −z side) in the z-axis direction will sometimes be referred to as a lower side (or an axially lower side). It should be noted, however, that the above definitions of the vertical direction and the upper and lower sides are made simply for the sake of convenience in description, and are not meant to indicate relative positions or directions of different members or portions when those members or portions are actually installed in a device. In addition, unless otherwise specified, the direction parallel to the central axis J (i.e., the z-axis direction) will sometimes be simply referred to by the term "axial direction", "axial", or "axially", radial directions centered on the central axis J will sometimes be simply referred to by the term "radial direction", "radial", or "radially", and the circumferential direction about the central axis J (that is, the Oz direction) will sometimes be simply referred to by the term "circumferential direction", "circumferential", or "circumferentially".

In addition, it is assumed herein that the wording "to extend in the axial direction", "to extend axially", or the like as used herein includes not only to extend exactly in the axial direction (i.e., the z-axis direction) but also to extend in a direction at an angle of less than 45 degrees to the axial direction. It is also assumed herein that the wording "to extend in a radial direction", "to extend radially", or the like as used herein includes not only to extend exactly in a radial direction or exactly radially, that is, exactly in a direction or directions perpendicular to the axial direction (i.e., the z-axis direction), but also to extend in a direction or directions at an angle of less than 45 degrees to the radial direction(s).

Figure 2:
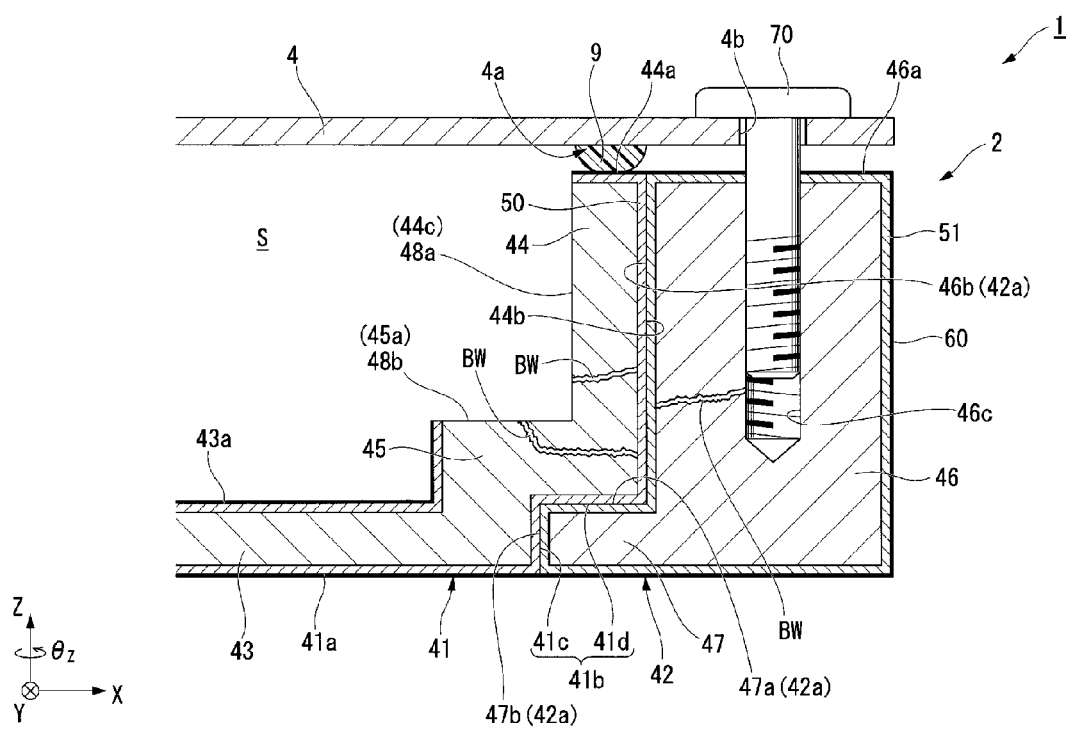
FIG. 2 is a cross-sectional view of a portion of the disk drive apparatus according to the first preferred embodiment of the present invention.

FIG. 1 is a cross-sectional view of a disk drive apparatus 1 according to a first preferred embodiment of the present invention. FIG. 2 is a cross-sectional view of a portion of the disk drive apparatus 1.

The disk drive apparatus 1 is a hard disk drive. Referring to FIG. 1, the disk drive apparatus 1 includes a spindle motor 2, a plurality of disks 5, an access portion 3, and a cover member 4. That is, the spindle motor 2 according to the present preferred embodiment is used in the disk drive apparatus 1.

The spindle motor 2 is arranged to rotate the plurality of disks 5 about the central axis J (i.e., in $\pm\theta_z$ directions). The spindle motor 2 includes a base portion 41, a rotor portion 10, a bearing portion 20, and a stator portion 30. Referring to FIG. 2, the spindle motor 2 includes screw attachment members 42.

Referring to FIG. 1, the base portion 41 is in the shape of a box with an opening on an upper side thereof. The base portion 41 is arranged to contain the disks 5, the access portion 3, the rotor portion 10, the bearing portion 20, and the stator portion 30. The base portion 41 includes a plate portion 43, a wall portion 44, and a stator support portion 49. The plate portion 43 is arranged to extend radially with respect to the central axis J. The wall portion 44 is arranged to extend in the axial direction from a radially outer edge of the plate portion 43. The stator support portion 49 is arranged to project upward from a plate portion upper surface 43a, which is an upper surface of the plate portion 43. Referring to FIG. 2, each screw attachment member 42 is fixed to the base portion 41. The base portion 41 and the screw attachment member 42 will be described in detail below.

Referring to FIG. 1, the rotor portion 10 is arranged to rotate about the central axis J (i.e., in the ±Oz directions) extending in the vertical direction. The rotor portion 10 includes a clamp member 11, a rotor hub 12, and a rotor magnet 13. The clamp member 11 is arranged to support the plurality of disks 5.

The bearing portion 20 is arranged to support the rotor portion 10 such that the rotor portion 10 is rotatable about the central axis J (i.e., in the $\pm\theta_z$ directions). The bearing portion 20 includes a shaft 21 and a sleeve 22. The shaft 21 is fixed to the base portion 41. The shaft 21 and the sleeve 22 are arranged opposite to each other with a gap intervening therebetween. A fluid, such as, for example, a lubricating oil or a gas, is arranged in the gap between the shaft 21 and the sleeve 22.

The stator portion 30 includes a stator core 32 and a plurality of coils 31. The stator core 32 is supported by the stator support portion 49. The stator core 32 is, for example, a laminated structure defined by laminated magnetic bodies. The stator core 32 includes a plurality of salient poles 33 arranged to project radially outward. One of the coils 31 is wound around each of the plurality of salient poles 33a. Each coil 31 is arranged radially opposite to the rotor magnet 13 with a gap intervening therebetween. That is, the stator portion 30 is arranged opposite to the rotor magnet 13.

The cover member 4 is attached to the spindle motor 2. More specifically, the cover member 4 is attached to an upper end of the wall portion 44 to close an upper opening of the spindle motor 2. The cover member 4 is, for example, in the shape of a plate.

Referring to FIG. 2, the cover member 4 is fixed to the spindle motor 2 through screws 70. That is, the disk drive apparatus 1 includes the screws 70, each of which is used to attach the cover member 4 to the spindle motor 2. Each screw 70 is screwed into a screw hole 46c described below through a cover member through hole 4b arranged to pass through the cover member 4 in the axial direction.

The cover member 4 includes a sealing portion 4a. The sealing portion 4a is a portion of a lower surface of the cover member 4. The sealing portion 4a is arranged to be in contact with a wall portion upper surface 44a, which is an upper surface of the wall portion 44. That is, the wall portion 44 is arranged to support at least a portion of the cover member 4.

According to the present preferred embodiment, the sealing portion 4a is arranged to be, for example, in indirect contact with the wall portion upper surface 44a through a sealing member 9. The sealing member 9 is not limited to any particular member, and is, for example, a gasket made of a resin material or the like. The sealing portion 4a is arranged radially inward of each screw hole 46c, which will be described below.

Referring to FIG. 1, the disk drive apparatus 1 includes a housing space S enclosed by the base portion 41 and the cover member 4. The housing space S is filled with, for example, a helium gas. Note that the housing space S may alternatively be filled with a hydrogen gas, air, or the like. Referring to FIGS. 1 and 2, in the present preferred embodiment, the base portion 41, the screw attachment members 42, and the cover member 4 together define a housing of the disk drive apparatus 1.

Each of the disks 5 illustrated in FIG. 1 is an information storage medium. Each disk 5 is supported by the spindle motor 2. More specifically, each disk 5 is supported by the rotor portion 10 of the spindle motor 2. Each disk 5 is arranged to rotate about the central axis J (i.e., in the $\pm\theta_z$ directions) together with the rotor portion 10.

The access portion 3 is arranged to perform at least one of reading and writing of information from or to the disks 5. The access portion 3 includes heads 6, arms 7, and a head actuator mechanism 8. Each of the heads 6 is arranged in close proximity to a surface of one of the disks 5 to magnetically perform at least one of the reading and the writing of information.

Each head 6 is supported by an associated one of the arms 7. Each arm 7 is supported by the head actuator mechanism 8.

Next, the base portion 41 will now be described in detail below. The base portion 41 is molded by casting. The base portion 41 is, for example, a die-cast member made of an aluminum alloy. Referring to FIG. 2, the base portion 41 according to the present preferred embodiment includes a chill layer 50 at a surface thereof. The chill layer 50 is a layer which has a denser internal structure than that of a remaining portion of the base portion 41 and which is defined as a result of rapid cooling of a portion of a material of the base portion 41 which adjoins a mold when the base portion 41 is molded by casting.

The chill layer 50 of the base portion 41 according to the present preferred embodiment is arranged to extend over the entire surface of the base portion 41, excluding metal-exposed surfaces including metal surfaces 48a and 48b described below. That is, a portion of the chill layer 50 of the base portion 41 extends over an entire portion of the surface of the base portion 41 which is opposed to each screw attachment member 42. Thus, the wall portion 44 includes a portion of the chill layer at a contact surface 44b, which is a surface of the wall portion 44 which is opposed to the screw attachment member 42.

Figure 3:
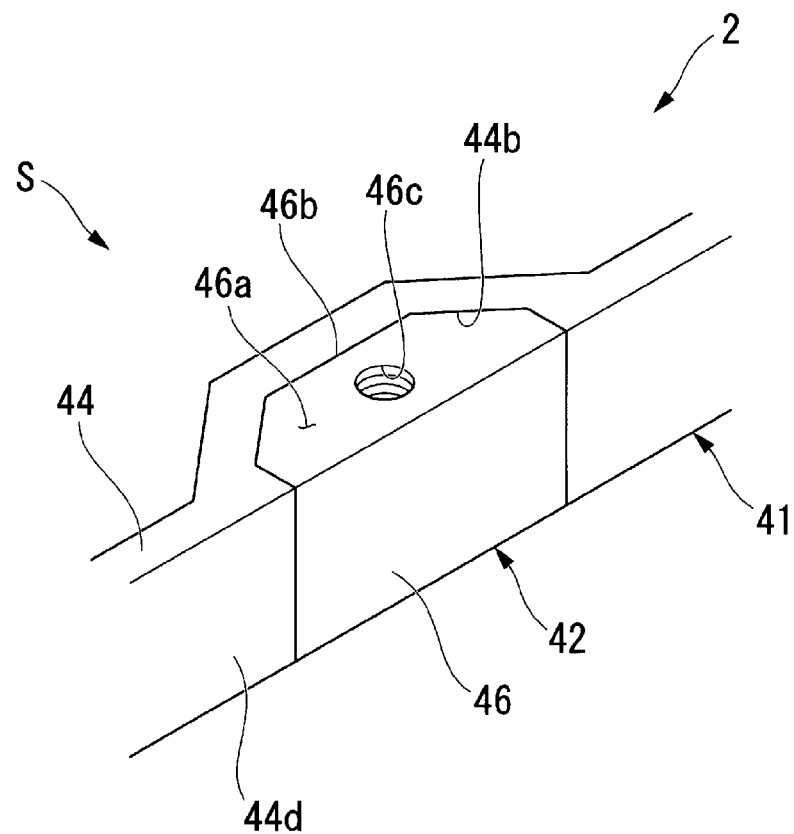
FIG. 3 is a perspective view of a portion of a spindle motor according to the first preferred embodiment of the present invention.
Figure 3:
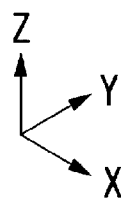

FIG. 3 is a perspective view of a portion of the spindle motor 2. Referring to FIG. 3, an outside surface (i.e., a surface on a +x side) of the wall portion 44 includes wall portion side surfaces 44d and the contact surface 44b. Each wall portion side surface 44d is a portion of the outside surface of the wall portion 44 which defines a portion of an outside surface of the disk drive apparatus 1. The contact surface 44b is a portion of the outside surface of the wall portion 44 which is arranged to be in contact with the screw attachment member 42.

The contact surface 44b is a recessed surface which is recessed toward the housing space S (i.e., to a −x side) relative to the wall portion side surfaces 44d. The contact surface 44b is arranged to form, for example, a broken line in a plan view. In the preferred embodiment illustrated in FIG. 3, the contact surface 44b is arranged to form, for example, a broken line made up of a connected series of five line segments in the plan view. The contact surface 44b is arranged opposite to the screw attachment member 42.

Note that it is assumed herein that the outside surface of the wall portion includes a surface of the wall portion which faces away from the housing space S.

Referring to FIG. 2, the base portion 41 includes an installation portion 45. The installation portion 45 is arranged to project upward from the plate portion upper surface 43a. The installation portion 45 is joined to the wall portion 44. A ramp mechanism, for example, is attached to an installation portion upper surface 45a, which is an upper surface of the installation portion 45. The ramp mechanism is a mechanism to hold each head 6 when each disk 5 is stopped.

According to the present preferred embodiment, an inside surface of the base portion 41 includes the metal surfaces 48a and 48b, each of which has been subjected to a cutting process. In the preferred embodiment illustrated in FIG. 2, the metal surface 48a defines at least a portion of a wall portion inside surface 44c, which is an inside surface of the wall portion 44. In the preferred embodiment illustrated in FIG. 2, the metal surface 48b defines at least a portion of the installation portion upper surface 45a. The metal surface 48a is arranged to be, for example, parallel to the central axis J. The metal surface 48b is arranged to be, for example, perpendicular to the central axis J. The metal surface 48a and the metal surface 48b are, for example, joined to each other. According to the present preferred embodiment, both the metal surfaces 48a and 48b are arranged, for example, in the vicinity of the wall portion 44.

Note that the term "metal surface" as used herein refers to, for example, a portion of the surface of the cast base portion 41 at which a metallic portion beneath the chill layer 50 is exposed to the housing space S. Metal surfaces according to preferred embodiments of the present invention may be flat surfaces like the metal surfaces 48a and 48b as illustrated in FIG. 2, curved surfaces, or inner surfaces of holes.

Also note that the inside surface of the base portion as described herein includes a portion of the surface of the base portion which adjoins the housing space S. Also note that the inside surface of the wall portion as described herein includes a portion of the surface of the wall portion which adjoins the housing space S.

A base portion lower surface 41a, which is a lower surface of the base portion 41, includes a first recessed portion 41b, which is recessed upward. According to the present preferred embodiment, the first recessed portion 41b is arranged at, for example, a radially outer edge of the base portion lower surface 41a. The first recessed portion 41b is arranged in the outside surface of the wall portion 44. In the preferred embodiment illustrated in FIG. 2, the first recessed portion 41b is arranged at the contact surface 44b within the outside surface of the wall portion 44. The first recessed portion 41b includes a first recessed portion lower surface 41d, which is perpendicular to the central axis J and which is arranged to face downward, and a first recessed portion outside surface 41c, which is parallel to the central axis J and which is arranged to face the screw attachment member 42 (i.e., to the +x side).

Next, the screw attachment member 42 will now be described in detail below. The screw attachment member 42 is arranged on the wall portion 44. More specifically, according to the present preferred embodiment, the screw attachment member 42 is arranged on the outside surface of the wall portion 44. According to the present preferred embodiment, the screw attachment member 42 is arranged, for example, in the vicinity of the metal surfaces 48a and 48b.

Note that, when the screw attachment member is described herein as being arranged on the wall portion, it may mean that at least a portion of the screw attachment member is arranged to be in contact with the wall portion. For example, when the screw attachment member is described herein as being arranged on the wall portion, it may mean that the screw attachment member is arranged on the outside surface of the wall portion, or that the screw attachment member is embedded in the wall portion.

The screw attachment member 42 includes a body portion and a flange portion 47. Referring to FIG. 3, the body portion 46 is arranged inside of the contact surface 44b, which is a recessed surface. A body portion inside surface 46b, which is a surface of the body portion 46 which is opposed to the wall portion 44, is fixed to the contact surface 44b. That is, at least a portion of the screw attachment member 42 is fixed to the contact surface 44b. According to the present preferred embodiment, the screw attachment member 42 is thus fixed to the wall portion 44.

According to the present preferred embodiment, the contact surface 44b is arranged to form a broken line in the plan view as described above. This contributes to preventing the screw attachment member 42 from turning about an axis extending in the axial direction to be removed from the base portion 41.

In the preferred embodiment illustrated in FIG. 3, the body portion 46 is arranged to form, for example, a hexagonal prism extending in the axial direction. The body portion inside surface 46b is, for example, arranged to have a shape matching that of the contact surface 44b in a plan view. That is, in the preferred embodiment illustrated in FIG. 3, the body portion inside surface 46b is arranged to form a broken line made up of a connected series of five line segments in the plan view. According to the present preferred embodiment, the entire body portion inside surface 46b is arranged to be in contact with the contact surface 44b.

A body portion upper surface 46a, which is an upper surface of the body portion 46, is arranged to be flush with the wall portion upper surface 44a. The body portion upper surface 46a includes the screw hole 46c. That is, the screw attachment member 42 includes the screw hole 46c. Referring to FIG. 2, the screw hole 46c is recessed downward from the body portion upper surface 46a. In the preferred embodiment illustrated in FIG. 2, the screw hole 46c is arranged to overlap with both the metal surfaces 48a and 48b when viewed in a direction perpendicular to the central axis J, that is, in the x-axis direction in FIG. 2.

A blowhole (i.e., a gap) BW may be defined in the base portion 41 molded by casting. The blowhole BW is exposed to the housing space S by, for example, a cutting process. That is, each of the metal surfaces 48a and 48b, each of which has been subjected to the cutting process, may include a blowhole BW which opens into a space inside the base portion 41, i.e., into the housing space S. In this case, if the screw hole 46c were included in the base portion 41, for example, the blowhole BW might join the housing space S and the screw hole 46c to each other. If the blowhole BW joined the housing space S and the screw hole 46c to each other, the helium gas arranged in the housing space S might pass through the blowhole BW and the screw hole 46c to leak out of the disk drive apparatus 1.

In contrast, according to the present preferred embodiment, the screw hole 46c is included in the screw attachment member 42, which is separate from the base portion 41. Therefore, referring to FIG. 2, blowholes BW defined in the base portion 41 are closed at a boundary between the base portion 41 and the screw attachment member 42 with a high probability. Thus, each blowhole BW is prevented from joining the housing space S and the screw hole 46c to each other. Therefore, it can be said that the spindle motor 2 and the disk drive apparatus 1 according to the present preferred embodiment have structures which are able to prevent a leakage of the internal gas.

In addition, portions of the base portion at which screw holes are defined to attach the cover member or the like to the base portion tend to have increased thicknesses. Blowholes BW tend to be defined more easily in portions of a cast which have greater thicknesses. Accordingly, blowholes BW tend to be defined more easily in the portions of the base portion at which the screw holes are defined than in other portions of the base portion. Therefore, the helium gas in the housing space S tends to leak more likely through a screw hole than through another portion.

In contrast, according to the present preferred embodiment, the helium gas can be prevented from leaking through any screw hole 46c as described above, and therefore, a leakage of the helium gas out of the housing space S can be particularly effectively prevented. Moreover, since each screw attachment member 42 is provided separately from the base portion 41, the thickness of a portion of the base portion 41 to which the screw attachment member 42 is fixed can be reduced. Thus, according to the present preferred embodiment, the likelihood that a blowhole BW will be defined in the base portion 41 can be reduced.

Moreover, according to the present preferred embodiment, the wall portion 44 includes a portion of the chill layer 50 at the contact surface 44b. Because the chill layer 50 has a relatively dense internal structure, no blowhole BW is defined in the chill layer 50. Accordingly, any blowhole BW defined in the wall portion 44 is more securely closed by the chill layer 50. Therefore, according to the present preferred embodiment, the likelihood that a leakage of the helium gas will occur can be further reduced.

The flange portion 47 is arranged to extend from a lower end portion of the body portion 46 toward the base portion 41, that is, to the −x side in FIG. 2. The flange portion 47 is accommodated in the first recessed portion 41b. A flange portion upper surface 47a, which is an upper surface of the flange portion 47, and the first recessed portion lower surface 41d are arranged to be in contact with each other. This prevents the screw attachment member 42 from being removed upward from the base portion 41. In particular, when the screw 70 is screwed into the screw hole 46c, an upward force is exerted on the screw attachment member 42. A removal of the screw attachment member from the base portion 41 at this time can be effectively prevented. A flange portion tip surface 47b, which is a tip surface of the flange portion 47 on the side to which the flange portion 47 extends (i.e., on the −x side), is arranged to be in contact with the first recessed portion outside surface 41c.

Both a lower surface of the body portion 46 and a lower surface of the flange portion 47 are arranged to be flush with the base portion lower surface 41a. In other words, a lower surface of the screw attachment member 42 is arranged to be flush with the base portion lower surface 41a.

According to the present preferred embodiment, the screw attachment member 42 is, for example, molded by casting. An entire surface of the screw attachment member 42, excluding, for example, a portion thereof at which the screw hole 46c is defined, includes a chill layer 51. Accordingly, a base portion opposed surface 42a, which is a surface of the screw attachment member 42 which is opposed to the base portion 41, includes a portion of the chill layer 51. According to the present preferred embodiment, the base portion opposed surface 42a includes, for example, the body portion inside surface 46b, the flange portion upper surface 47a, and the flange portion tip surface 47b. That is, the screw attachment member 42 includes a portion of the chill layer 51 at the body portion inside surface 46b, which is a surface opposed to the wall portion 44.

Therefore, even if a blowhole BW is defined in the screw attachment member 42 as illustrated in FIG. 2, the blowhole BW is closed by the chill layer 51. Accordingly, the likelihood that any blowhole BW will join the housing space S and the screw hole 46c to each other can be further reduced. Moreover, according to the present preferred embodiment, the wall portion 44 and the screw attachment member 42 include portions of the chill layers 50 and 51, respectively, at surfaces thereof opposed to each other, and accordingly, any blowhole BW can be more securely closed at the boundary between the wall portion 44 and the screw attachment member 42. Therefore, a leakage of the helium gas out of the housing space S can be more effectively prevented.

Although not shown in the figures, the spindle motor 2 includes, for example, as many screw attachment members 42 as the number of screws 70 needed to attach the cover member 4 to the spindle motor 2. The spindle motor 2 includes, for example, six screw attachment members 42. The disk drive apparatus 1 includes, for example, six screws 70. Each screw attachment member 42 is molded, for example, by injecting a metal into a mold in which the base portion 41 is placed after being molded by casting using a different mold.

According to the present preferred embodiment, the spindle motor 2 includes a coating film 60. In the preferred embodiment illustrated in FIG. 2, the coating film 60 is arranged to cover the entire surfaces of the base portion 41 and each screw attachment member 42, excluding the metal surfaces 48a and 48b and the screw hole 46c of each screw attachment member 42. The coating film 60 is, for example, a resin film, such as an epoxy resin film, or a metal film, such as nickel plating.

Note that the present preferred embodiment can be modified in any of the following manners.

In a modification of the present preferred embodiment, at least one of the screw holes 46c may be defined in the base portion 41. In other words, in a modification of the present preferred embodiment, the number of screw attachment members 42 may be smaller than the number of screws 70 needed to attach the cover member 4 to the spindle motor 2.

Also, in a modification of the present preferred embodiment, the base portion 41 may not include the chill layer 50. Also, in a modification of the present preferred embodiment, each screw attachment member 42 may not include the chill layer 51. Also, in a modification of the present preferred embodiment, the spindle motor 2 may not include the coating film 60.

Also, in a modification of the present preferred embodiment, the contact surface 44b may be arranged to form, for example, a broken line made up of a connected series of two, three, four, or more than five line segments in a plan view. Also, in a modification of the present preferred embodiment, the contact surface 44b may be a curved surface or a combination of a flat surface(s) and a curved surface(s).

Also, in a modification of the present preferred embodiment, each screw attachment member 42 may be molded by casting separately, and be fixed to the base portion 41. In this case, the screw attachment member 42 is fixed to the base portion 41 through, for example, an adhesive. Also, in a modification of the present preferred embodiment, each screw attachment member 42 may be made of a resin.

Also, in a modification of the present preferred embodiment, the flange portion upper surface 47a and the first recessed portion lower surface 41d may be arranged to be in indirect contact with each other. For example, in the case where each screw attachment member 42 is fixed to the base portion 41 through an adhesive, the flange portion upper surface 47a and the first recessed portion lower surface 41d are arranged to be in indirect contact with each other with the adhesive intervening therebetween.

Also, in a modification of the present preferred embodiment, the inside surface of the base portion 41 may include only one of the metal surfaces 48a and 48b. Also, in a modification of the present preferred embodiment, the plate portion upper surface 43a may include a metal surface. Also, in a modification of the present preferred embodiment, the inside surface of the base portion 41 may include a metal surface at any position.

Also, in a modification of the present preferred embodiment, the disk drive apparatus 1 may not include the sealing member 9. In this case, the sealing portion 4a of the cover member 4 is arranged to be in direct contact with the wall portion upper surface 44a, for example.

Next, a first modification, a second modification, and a third modification of the present preferred embodiment will now be described below with reference to FIGS. 4, 5A, 5B, and 6. Note that, in the following description, members or portions that have their equivalents in the present preferred embodiment described above are denoted appropriately by the same reference numerals as those of their equivalents in the present preferred embodiment described above, and descriptions of such members or portions may be omitted.

Figure 4:
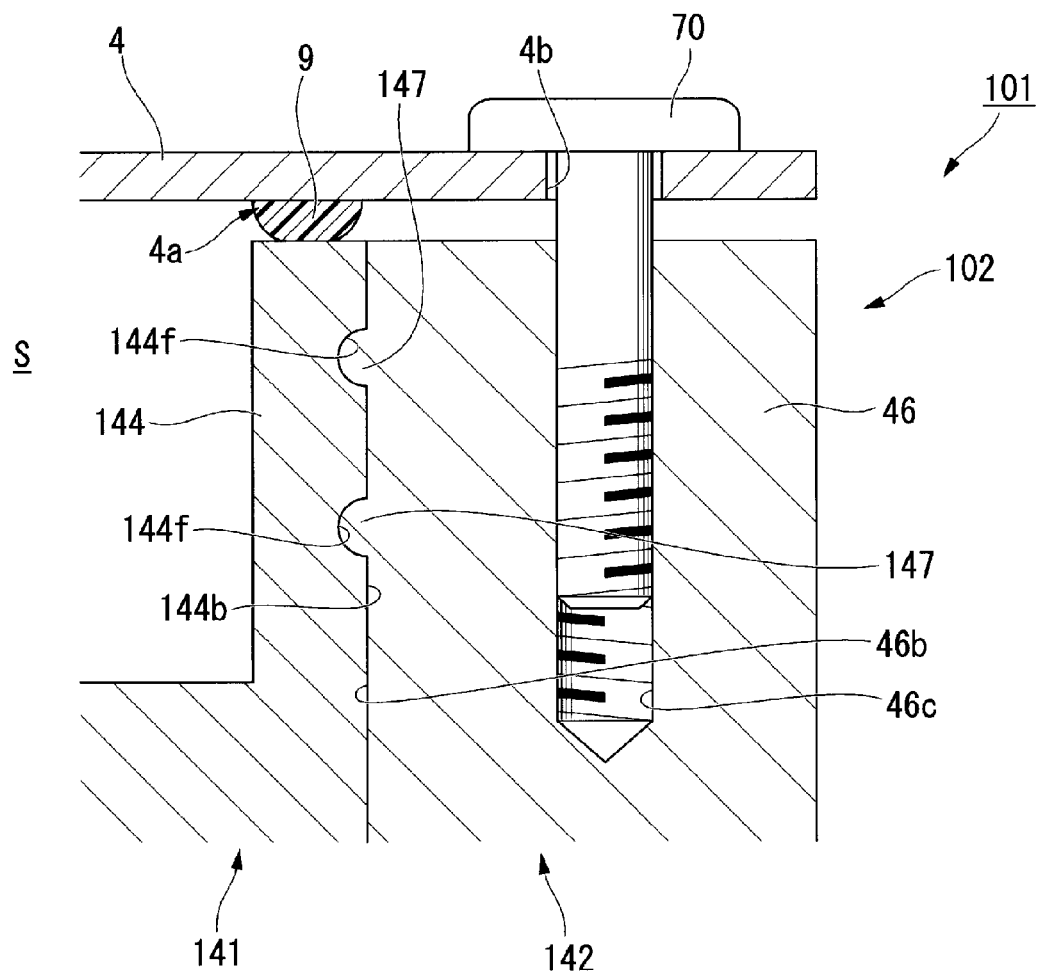
FIG. 4 is a cross-sectional view of a portion of a disk drive apparatus according to a first modification of the first preferred embodiment of the present invention.
Figure 4:
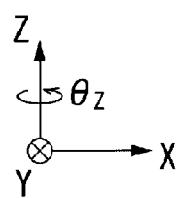

FIG. 4 is a cross-sectional view of a portion of a disk drive apparatus 101 according to the first modification of the present preferred embodiment. In FIG. 4, illustration of chill layers 50 and 51 and a coating film 60 is omitted.

Referring to FIG. 4, the disk drive apparatus 101 includes a spindle motor 102. The spindle motor 102 includes a base portion 141 and a screw attachment member 142. The base portion 141 includes a wall portion 144.

A contact surface 144b, which is a portion of an outside surface of the wall portion 144 with which the screw attachment member 142 is arranged to be in contact, includes second recessed portions 144f. That is, a surface of the base portion 141 which is opposed to the screw attachment member 142 includes the second recessed portions 144f. Each second recessed portion 144f is recessed toward a housing space S (i.e., to the −x side) relative to the contact surface 144b.

In the first modification illustrated in FIG. 4, the contact surface 144b includes, for example, two of such second recessed portions 144f. The two second recessed portions 144f are arranged one above the other in the axial direction. Each second recessed portion 144f is, for example, hemispherical. That is, the second recessed portion 144f includes at least one hemispherical recessed portion.

The screw attachment member 142 includes a body portion 46 and raised portions 147. Each raised portion 147 is arranged to project toward the housing space S (i.e., to the −x side) from a body portion inside surface 46b. That is, the body portion inside surface 46b, which is a surface of the screw attachment member 142 which is opposed to the base portion 141, includes the raised portions 147.

In the first modification illustrated in FIG. 4, the screw attachment member 142 includes two of such raised portions 147. The two raised portions 147 are arranged one above the other in the axial direction. Each raised portion 147 is accommodated in a corresponding one of the second recessed portions 144f. This contributes to preventing the screw attachment member 142 from being removed from the base portion 141. In addition, because each second recessed portion 144f is hemispherical according to the present modification, the screw attachment member 142 can be prevented from moving in the axial direction relative to the base portion 141, and from turning about an axis extending in the axial direction relative to the base portion 141. This contributes to more effectively preventing the screw attachment member 142 from being removed from the base portion 141.

In the first modification illustrated in FIG. 4, each raised portion 147 is, for example, hemispherical. An entire surface of each raised portion 147 is arranged to be in contact with an inside surface of a corresponding one of the second recessed portions 144f, for example. The disk drive apparatus 101 is otherwise similar in structure to the disk drive apparatus 1 illustrated in FIGS. 1 to 3.

Note that, in the present modification, the spindle motor 102 may or may not include the first recessed portion 41b and the flange portion 47 as illustrated in FIG. 2. In the case where the spindle motor 102 includes the first recessed portion 41b and the flange portion 47, the screw attachment member 142 can be more effectively prevented from moving in the axial direction to be removed from the base portion 141.

Also note that, in the present modification, one of the surface of the base portion 141 which is opposed to the screw attachment member 142 and the surface of the screw attachment member 142 which is opposed to the base portion 141 includes the second recessed portions 144f while the other one of the above two surfaces includes the raised portions 147. That is, in the present modification, the body portion inside surface 46b and the contact surface 144b may alternatively be arranged to include the second recessed portions 144f and the raised portions 147, respectively.

Also note that, in the present modification, no particular limitation is imposed on the number of second recessed portions 144f and the number of raised portions 147, and the number of second recessed portions 144f and the number of raised portions 147 may each be one or more than two.

Figure 5A:
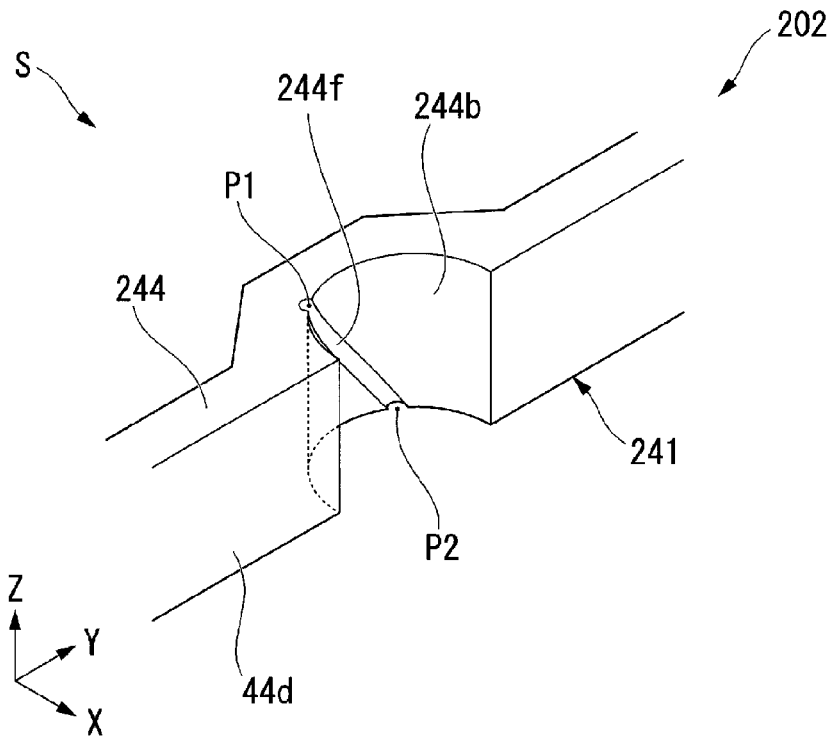
FIG. 5A is a perspective view of a portion of a spindle motor according to a second modification of the first preferred embodiment of the present invention.
Figure 5B:
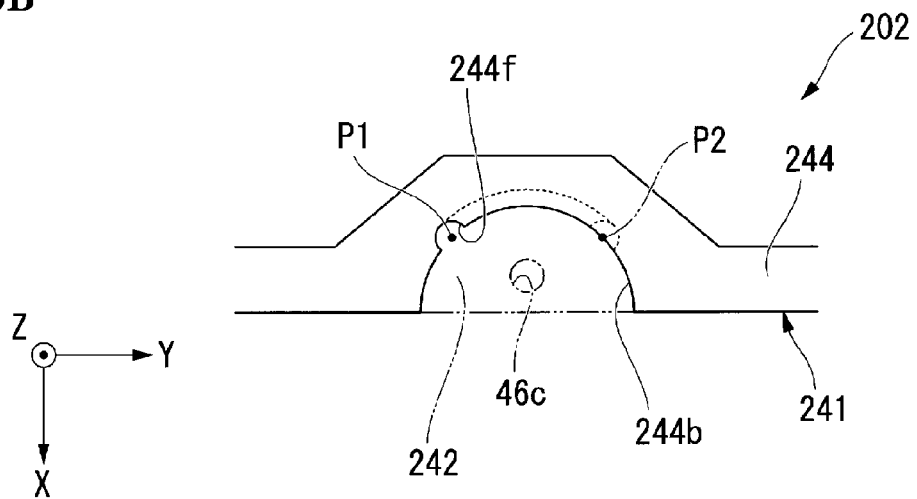
FIG. 5B is a plan view of a portion of the spindle motor according to the second modification of the first preferred embodiment of the present invention.

FIGS. 5A and 5B each is a diagram illustrating a portion of a spindle motor 202 according to the second modification of the present preferred embodiment. FIG. 5A is a perspective view. In FIG. 5A, illustration of a screw attachment member 242 is omitted. FIG. 5B is a plan view.

Referring to FIGS. 5A and 5B, the spindle motor 202 includes a base portion 241 and the screw attachment member 242. The base portion 241 includes a wall portion 244. An outside surface of the wall portion 244 includes a wall portion side surface 44d and a contact surface 244b. The contact surface 244b is recessed toward a housing space S (i.e., to the −x side) relative to the wall portion side surface 44d. Referring to FIG. 5B, the contact surface 244b is in the shape of a semicircular arc in a plan view.

Referring to FIG. 5A, the contact surface 244b includes a second recessed portion 244f. The second recessed portion 244f is in the shape of a groove, and is arranged to extend from an upper end portion of the contact surface 244b to a lower end portion of the contact surface 244b. That is, the second recessed portion 244f is arranged to be open on both axial end surfaces of the wall portion 244.

The second recessed portion 244f is arranged to extend at an angle to the axial direction. That is, at least one recessed portion arranged to extend in a direction at an angle to the axial direction is provided as the second recessed portion(s) 244f. This contributes to preventing the screw attachment member 242 from moving in the axial direction relative to the base portion 241, and from turning about an axis extending in the axial direction relative to the base portion 241.

The second recessed portion 244f includes a first position P1 and a second position P2, which is at a level lower than that of the first position P1. Referring to FIG. 5B, in a plan view, the second position P2 is displaced from the first position P1 in a clockwise direction about a screw hole 46c. This contributes to more effectively preventing the screw attachment member 242 from being removed upward from the base portion 241 when a screw 70 is screwed into the screw hole 46c.

In the second modification illustrated in FIG. 5B, the screw attachment member 242 is in the shape of, for example, a semicircle in a plan view. Although not shown in the figure, the screw attachment member 242 includes a raised portion arranged to be accommodated in the second recessed portion 244f. The spindle motor 202 is otherwise similar in structure to the spindle motor 2 illustrated in FIGS. 1 to 3.

Note that, in the present modification, the second recessed portion 244f may be arranged to be open on only one axial end surface of the wall portion 244, or on neither axial end surface of the wall portion 244.

Figure 6:
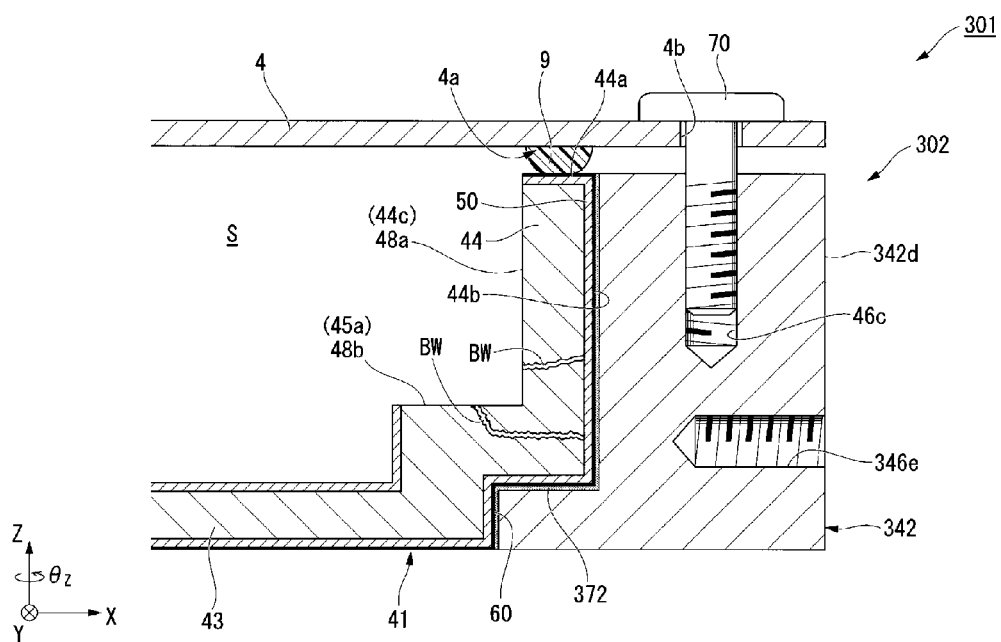
FIG. 6 is a cross-sectional view of a portion of a disk drive apparatus according to a third modification of the first preferred embodiment of the present invention.

FIG. 6 is a cross-sectional view of a portion of a disk drive apparatus 301 according to the third modification of the present preferred embodiment. Referring to FIG. 6, the disk drive apparatus 301 includes a spindle motor 302. The spindle motor 302 includes a base portion 41 and a screw attachment member 342.

An attachment member outside surface 342d, which is an outside surface of the screw attachment member 342, includes a screw hole 346e which is recessed toward a housing space S (i.e., to the −x side). An opening of the screw hole 346e in the attachment member outside surface 342d is arranged on a lower side of a screw hole 46c. The screw hole 346e is arranged to extend up to a position under the screw hole 46c, for example. The screw hole 346e is arranged radially outward of a sealing portion 4a of a cover member 4. A screw is screwed into the screw hole 346e to, for example, attach the disk drive apparatus 301 to another device, such as, for example, a personal computer. Note that the screw hole 46c and the screw hole 346e may be joined to each other.

Note that it is assumed herein that the outside surface of the screw attachment member includes a surface of the screw attachment member which faces away from the housing space S.

In the present modification, the screw attachment member 342 is defined by a cutting process. Accordingly, no blowhole BW is defined in the screw attachment member 342. Therefore, the housing space S and each of the screw holes 46c and 346e are not joined to each other by a blowhole BW, and the helium gas does never leak out through a blowhole BW and the screw hole 46c or 346e. Therefore, according to the third modification, the likelihood that a leakage of the helium gas will occur can be further reduced. Moreover, a wall portion 44 includes a portion of a chill layer 50 at a contact surface 44b, and therefore, any blowhole BW defined in the base portion 41 is closed at a boundary between the base portion 41 and the screw attachment member 342. Thus, the likelihood that a leakage of the helium gas will occur can be further reduced.

In the present modification, the contact surface 44b, which is a surface of the wall portion 44 which is opposed to the screw attachment member 342, includes a portion of a coating film 60. Accordingly, even if a blowhole BW has an opening in the contact surface 44b, for example, the helium gas is blocked by the coating film 60, and is prevented from leaking out. Moreover, in the case where the contact surface 44b includes a portion of the chill layer 50 as in the present modification, the likelihood that a leakage of the helium gas will occur is further reduced by the chill layer 50 and the coating film 60.

In the present modification, the screw attachment member 342 is fixed to the base portion 41 through an adhesive 372. That is, the adhesive 372 is arranged between the base portion 41 and the screw attachment member 342. Accordingly, even if a blowhole BW has an opening in the contact surface 44b, for example, the helium gas is blocked by the adhesive 372, and is prevented from leaking out.

The disk drive apparatus 301 is otherwise similar in structure to the disk drive apparatus 1 illustrated in FIGS. 1 to 3.

Note that, in the present modification, the screw attachment member 342 may be arranged to include three or more screw holes, for example. Also note that, in the present modification, the screw attachment member 342 may be arranged to include a screw hole in a lower surface thereof, for example. Also note that, in the present modification, each of the screw holes 46c and 346e may be arranged to extend in any desirable direction.

A second preferred embodiment of the present invention is different from the first preferred embodiment in that each screw attachment member is embedded in the wall portion. Note that members or portions that have their equivalents in the first preferred embodiment are denoted appropriately by the same reference numerals as those of their equivalents in the first preferred embodiment, and descriptions of such members or portions may be omitted.

Figure 7:
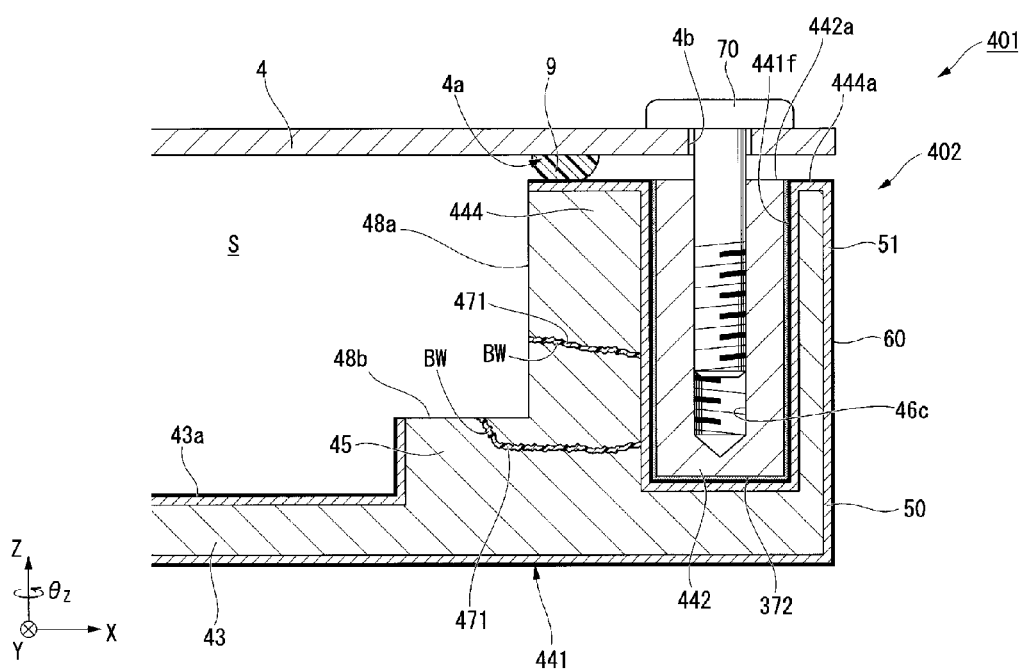
FIG. 7 is a cross-sectional view of a portion of a disk drive apparatus according to a second preferred embodiment of the present invention.

FIG. 7 is a cross-sectional view of a portion of a disk drive apparatus 401 according to the second preferred embodiment of the present invention. Referring to FIG. 7, the disk drive apparatus 401 includes a spindle motor 402. The spindle motor 402 includes a base portion 441 and a screw attachment member 442. The base portion 441 includes a wall portion 444.

The wall portion 444 includes a hole portion 441f. The hole portion 441f is, for example, recessed downward from a wall portion upper surface 444a, which is an upper surface of the wall portion 444. Note that no particular limitation is imposed on the shape of the hole portion 441f. In the second preferred embodiment illustrated in FIG. 7, the hole portion 441f is, for example, in the shape of a rectangular parallelepiped. The hole portion 441f is, for example, defined simultaneously when the base portion 441 is molded by casting. According to the present preferred embodiment, an inside surface of the hole portion 441f includes a portion of a chill layer 50. The inside surface of the hole portion 441f includes a portion of a coating film 60 arranged to cover the chill layer 50.

The screw attachment member 442 is arranged in the hole portion 441f. Thus, when the screw attachment member 442, which is manufactured separately, is fixed to the base portion 441, the screw attachment member 442 is easily held in the hole portion 441f. Thus, the screw attachment member 442 is easily fixed to the base portion 441.

According to the present preferred embodiment, the screw attachment member 442 is, for example, in the shape of a rectangular parallelepiped. The screw attachment member 442 is fixed in the hole portion 441f through an adhesive 372. An attachment member upper surface 442a, which is an upper surface of the screw attachment member 442, is arranged to be flush with the wall portion upper surface 444a, for example. The wall portion upper surface 444a includes a screw hole 46c.

The screw attachment member 442 is, for example, inserted in the hole portion 441f with the adhesive 372 applied to the inside surface of the hole portion 441f or a surface of the screw attachment member 442.

According to the present preferred embodiment, each of metal surfaces 48a and 48b includes a blowhole BW which opens into a space inside the base portion 441, i.e., into a housing space S. In other words, each of the metal surfaces 48a and 48b includes a gap which opens into the space inside the base portion 441. A resin 471 is arranged in each gap, i.e., in each blowhole BW. This contributes to preventing a helium gas in the housing space S from entering into the blowhole BW, and to more effectively preventing a leakage of the helium gas. Note that any resin that can be arranged in each blowhole BW may be used as the resin 471.

Note that, in the present preferred embodiment, the screw attachment member 442 may be molded by casting. In this case, a metal may be injected into a mold in which the base portion 441 is placed after being molded by casting using a different mold, or alternatively, the screw attachment member 442 may be molded by casting separately, and be thereafter fixed in the hole portion 441f of the base portion 441.

Also note that, in the present preferred embodiment, the screw attachment member 442 may alternatively be fixed to the base portion 441 by a method other than using the adhesive 372. For example, in the present preferred embodiment, the screw attachment member 442 may alternatively be press fitted into the hole portion 441f to be fixed to the base portion 441.

Figure 8:
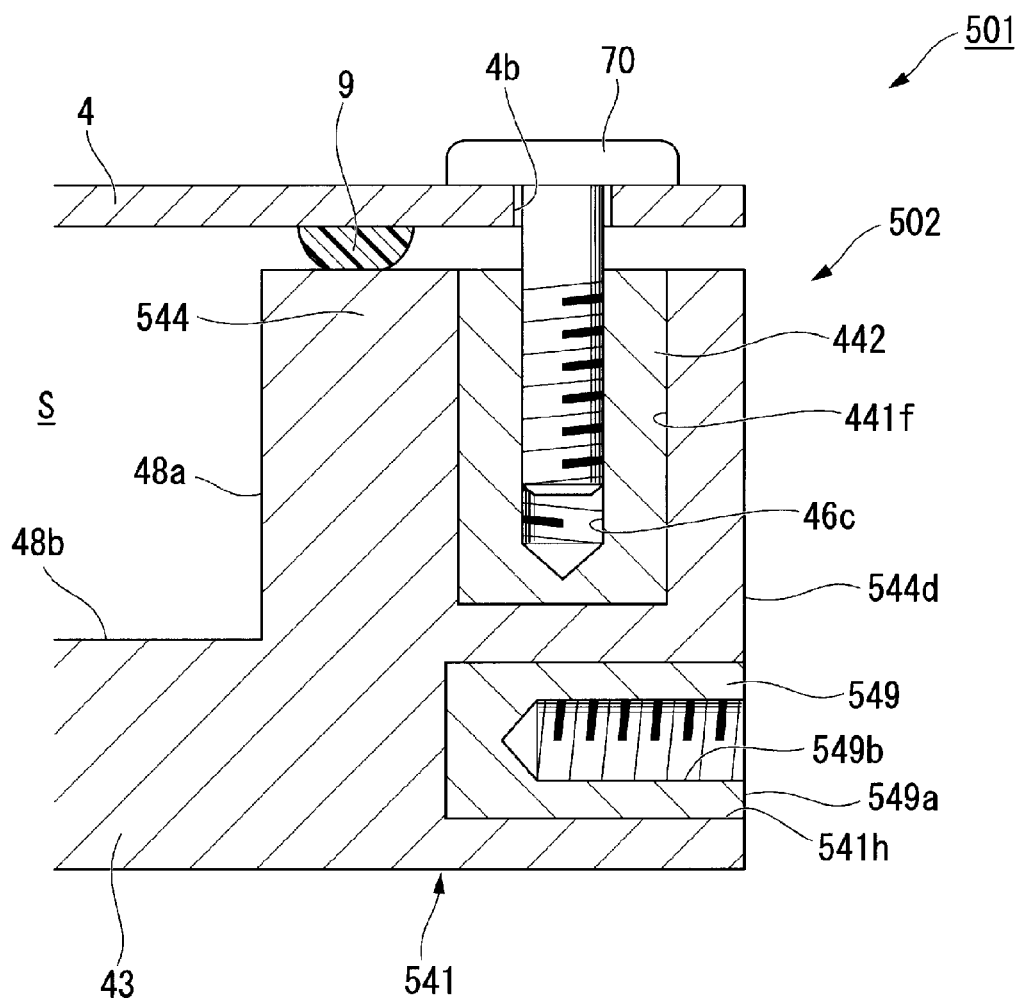
FIG. 8 is a cross-sectional view of a portion of a disk drive apparatus according to a modification of the second preferred embodiment of the present invention.

Also note that the present preferred embodiment may be modified in a manner as illustrated in FIG. 8. FIG. 8 is a cross-sectional view of a portion of a disk drive apparatus 501 according to a modification of the present preferred embodiment. Note that, in the following description, members or portions that have their equivalents in the present preferred embodiment described above are denoted appropriately by the same reference numerals as those of their equivalents in the present preferred embodiment described above, and descriptions of such members or portions may be omitted.

Referring to FIG. 8, the disk drive apparatus 501 includes a spindle motor 502. The spindle motor 502 includes a base portion 541, a screw attachment member 442, and a screw attachment member 549.

The base portion 541 includes a wall portion 544. The wall portion 544 includes a hole portion 441f and a hole portion 541h. The hole portion 541h is recessed inward from a wall portion side surface 544d, which is an outside surface of the wall portion 544.

The screw attachment member 549 is arranged in the hole portion 541h. An attachment member outside surface 549a, which is an outside surface of the screw attachment member 549, includes a screw hole 549b. The screw hole 549b is recessed toward a housing space S (i.e., to the −x side) from the attachment member outside surface 549a. The attachment member outside surface 549a is arranged to be flush with the wall portion side surface 544d, for example. The disk drive apparatus 501 is otherwise similar in structure to the disk drive apparatus 401 illustrated in FIG. 7.

Note that, in the present modification, one of the screw attachment member 442 and the screw attachment member 549 may be molded by casting, with the other one of the screw attachment member 442 and the screw attachment member 549 being a member defined by a cutting process.

Also note that, in the present modification, no particular limitation is imposed on the number of screw attachment members, and three or more screw attachment members may be provided. Also note that, in the present modification, at least one of the screw attachment members may include a plurality of screw holes.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor for use in a disk drive apparatus including a cover member to be attached to the spindle motor, the spindle motor comprising:
    a rotor portion arranged to rotate about a central axis extending in a vertical direction, and including a rotor magnet;
    a bearing portion arranged to support the rotor portion such that the rotor portion is rotatable about the central axis;
    a stator portion arranged opposite to the rotor magnet;
    a base portion molded by casting, and arranged to contain the rotor portion, the bearing portion, and the stator portion; and
    a screw attachment member fixed to the base portion, and including a screw hole; wherein
    the base portion includes a plate portion arranged to extend radially with respect to the central axis, and a wall portion arranged to extend in an axial direction from a radially outer edge of the plate portion;
    the wall portion is arranged to support at least a portion of the cover member;

an inside surface of the base portion includes a metal surface subjected to a cutting process; and the screw attachment member is arranged on the wall portion.

2. The spindle motor according to claim 1, wherein
the screw attachment member is molded by casting;
the wall portion includes a chill layer at a surface thereof which is opposed to the screw attachment member; and
the screw attachment member includes a chill layer at a surface thereof which is opposed to the wall portion.

3. The spindle motor according to claim 1, wherein
the screw attachment member is a member defined by a cutting process; and
the wall portion includes a chill layer at a surface thereof which is opposed to the screw attachment member.

4. The spindle motor according to claim 1, wherein a surface of the wall portion which is opposed to the screw attachment member includes a coating film.

5. The spindle motor according to claim 1, wherein
a lower surface of the base portion includes a first recessed portion recessed axially upward;
the screw attachment member includes a body portion including the screw hole, and a flange portion arranged to extend from an axially lower end portion of the body portion toward the base portion, and accommodated in the first recessed portion; and
an upper surface of the flange portion and a lower surface of the first recessed portion are arranged to be in contact with each other.

6. The spindle motor according to claim 1, wherein
the wall portion includes a hole portion; and
the screw attachment member is arranged in the hole portion.

7. The spindle motor according to claim 1, wherein one of a surface of the base portion which is opposed to the screw attachment member and a surface of the screw attachment member which is opposed to the base portion includes at least one second recessed portion, while another one of the surface of the base portion which is opposed to the screw attachment member and the surface of the screw attachment member which is opposed to the base portion includes at least one raised portion each of which is arranged to be accommodated in a corresponding one of the at least one second recessed portion.

8. The spindle motor according to claim 7, wherein the at least one second recessed portion includes at least one hemispherical recessed portion.

9. The spindle motor according to claim 7, wherein the at least one second recessed portion includes at least one recessed portion arranged to extend in a direction at an angle to the axial direction.

10. The spindle motor according to claim 9, wherein
each second recessed portion includes a first position and a second position which is at a level lower than that of the first position; and
in a plan view, the second position is displaced from the first position in a clockwise direction about the screw hole.

11. The spindle motor according to claim 1, wherein
an outside surface of the wall portion includes a contact surface with which the screw attachment member is arranged to be in contact, the contact surface forming a broken line in a plan view; and
at least a portion of the screw attachment member is fixed to the contact surface.

12. The spindle motor according to claim 11, wherein one of the contact surface and a surface of the screw attachment member which is opposed to the contact surface includes at least one second recessed portion, while another one of the contact surface and the surface of the screw attachment member which is opposed to the contact surface includes at least one raised portion each of which is arranged to be accommodated in a corresponding one of the at least one second recessed portion.

13. The spindle motor according to claim 12, wherein the at least one second recessed portion includes at least one hemispherical recessed portion.

14. The spindle motor according to claim 12, wherein the at least one second recessed portion includes at least one recessed portion arranged to extend in a direction at an angle to the axial direction.

15. The spindle motor according to claim 14, wherein
each second recessed portion includes a first position and a second position which is at a level lower than that of the first position; and
in a plan view, the second position is displaced from the first position in a clockwise direction about the screw hole.

16. The spindle motor according to claim 1, further comprising an adhesive arranged between the base portion and the screw attachment member.

17. The spindle motor according to claim 1, wherein
the metal surface includes a gap which opens into a space inside the base portion; and
a resin is arranged in the gap.

18. A disk drive apparatus comprising:
the spindle motor of claim 1;
a disk supported by the spindle motor;
an access portion arranged to perform at least one of reading and writing of information from or to the disk;
a cover member attached to the spindle motor; and
a screw used to attach the cover member to the spindle motor; wherein
the cover member includes a sealing portion arranged to be in contact with an upper surface of the wall portion; and
the sealing portion is arranged radially inward of the screw hole.

* * * * *